(12) United States Patent
Dotzel et al.

(10) Patent No.: US 8,641,993 B2
(45) Date of Patent: Feb. 4, 2014

(54) NO_x ABSORBER CATALYSTS

(75) Inventors: Ralf Dotzel, Nuremberg (DE); Rainer Leppelt, Lichtenfels (DE); Elizabeth Hazel Mountstevens, Royston (GB); Jörg Werner Münch, Lichtenfels (DE); Paul Richard Phillips, Royston (GB); Hubert Schedel, Küps (DE); Daniel Swallow, Sandy (GB)

(73) Assignee: Johnson Matthey Public Limited Co., London (GB)

( * ) Notice: Subject to any disclaimer, the term of this patent is extended or adjusted under 35 U.S.C. 154(b) by 0 days.

(21) Appl. No.: 13/384,564

(22) PCT Filed: Feb. 1, 2011

(86) PCT No.: PCT/GB2011/050164
§ 371 (c)(1),
(2), (4) Date: Jan. 17, 2012

(87) PCT Pub. No.: WO2011/092523
PCT Pub. Date: Aug. 4, 2011

(65) Prior Publication Data
US 2012/0110988 A1     May 10, 2012

Related U.S. Application Data

(60) Provisional application No. 61/300,279, filed on Feb. 1, 2010.

(51) Int. Cl.
| | | |
|---|---|---|
| B01D 53/94 | (2006.01) | |
| B01J 23/02 | (2006.01) | |
| B01J 23/28 | (2006.01) | |
| B01J 29/00 | (2006.01) | |
| B01J 37/00 | (2006.01) | |
| F01N 3/28 | (2006.01) | |

(52) U.S. Cl.
USPC .............. 423/213.2; 423/213.5; 423/239.1; 423/239.2; 502/60; 502/64; 502/66; 502/74; 502/304; 502/325; 502/328; 502/330; 60/299; 55/DIG. 30; 95/273; 95/285

(58) Field of Classification Search
USPC ........ 423/213.2, 213.5, 239.1, 239.2; 502/60, 502/64, 66, 74, 304, 325, 328, 330; 60/299; 55/DIG. 30; 95/273, 285
See application file for complete search history.

(56) References Cited

U.S. PATENT DOCUMENTS

| | | |
|---|---|---|
| 3,181,231 A | 5/1965 | Breck |
| 4,510,261 A | 4/1985 | Pereira et al. |
| 5,244,852 A | 9/1993 | Lachman et al. |
| 5,292,991 A | 3/1994 | Lachman et al. |
| 5,447,694 A | 9/1995 | Swaroop et al. |
| 5,552,128 A | 9/1996 | Chang et al. |
| 5,589,147 A | 12/1996 | Farnos et al. |
| 5,772,972 A | 6/1998 | Hepburn et al. |
| 5,897,846 A | 4/1999 | Kharas et al. |
| 6,110,862 A | 8/2000 | Chen et al. |
| 6,248,684 B1 | 6/2001 | Yavuz et al. |
| 6,432,859 B1 | 8/2002 | Iwakuni et al. |
| 6,488,903 B2 | 12/2002 | Mathes et al. |
| 6,555,081 B2 * | 4/2003 | Hori et al. .................. 423/239.1 |
| 6,667,018 B2 | 12/2003 | Noda et al. |
| 6,780,805 B2 | 8/2004 | Faber et al. |
| 7,507,684 B2 | 3/2009 | Hofmann et al. |
| 7,883,678 B2 | 2/2011 | Li et al. |
| 8,087,235 B2 * | 1/2012 | Strehlau et al. .................. 60/286 |
| 8,263,032 B2 | 9/2012 | Andersen et al. |
| 2002/0051742 A1 | 5/2002 | Hotta et al. |
| 2002/0077247 A1 | 6/2002 | Bender et al. |
| 2002/0140138 A1 | 10/2002 | Wu et al. |
| 2002/0183191 A1 | 12/2002 | Faber et al. |
| 2003/0125194 A1 | 7/2003 | Abe et al. |

(Continued)

FOREIGN PATENT DOCUMENTS

| | | | |
|---|---|---|---|
| EP | 0 756 891 A1 | 2/1997 | |
| EP | 0 801 972 A1 | 10/1997 | |

(Continued)

OTHER PUBLICATIONS

Li et al., "Application of zeolites as hydrocarbon traps in automotive emission controls," *Studies in Surface Science and Catalysis*, 2005, vol. 158, pp. 1375-1382.
U.S. Appl. No. 13/384,568, filed Jan. 17, 2012, Andersen et al.
U.S. Appl. No. 13/384,570, filed Jan. 17, 2012, Andersen et al.
U.S. Appl. No. 13/384,562, filed Jan. 17, 2012, Dotzel et al.
U.S. Appl. No. 13/384,572, filed Jan. 17, 2012, Collier et al.

(Continued)

*Primary Examiner* — Timothy Vanoy
(74) *Attorney, Agent, or Firm* — RatnerPrestia

(57) ABSTRACT

A $NO_x$ absorber catalyst comprising an extruded solid body comprises either:

(A) 10-95% by weight of at least one binder/matrix component; and 5-90% by weight of a zeolitic molecular sieve, a non-zeolitic molecular sieve or a mixture of any two or more thereof, which catalyst comprising at least one metal comprising (a) at least one precious metal; and (b) at least one alkali metal or at least one alkaline earth metal, wherein (a) and (b) are carried in one or more coating layer(s) on a surface of the extruded solid body; or (B) 10-95% by weight of at least one binder/matrix component; and 5-80% by weight optionally stabilized ceria, which catalyst comprising at least one metal comprising (a) at least one precious metal; and (b) at least one alkali metal or at least one alkaline earth metal.

23 Claims, 3 Drawing Sheets

(56) References Cited

U.S. PATENT DOCUMENTS

| | | |
|---|---|---|
| 2003/0224933 A1 | 12/2003 | Kondo et al. |
| 2006/0179825 A1 | 8/2006 | Hu et al. |
| 2007/0012028 A1 | 1/2007 | Weissman et al. |
| 2007/0014710 A1* | 1/2007 | Gerlach et al. ............. 423/213.5 |
| 2007/0134145 A1 | 6/2007 | Strehlau et al. |
| 2007/0259770 A1 | 11/2007 | Hofmann et al. |
| 2008/0069743 A1 | 3/2008 | Castellano et al. |
| 2008/0182020 A1 | 7/2008 | Eberle et al. |
| 2009/0143221 A1 | 6/2009 | Ogunwumi et al. |
| 2009/0196813 A1 | 8/2009 | Sobolevskiy et al. |
| 2010/0034717 A1 | 2/2010 | Adelmann et al. |
| 2010/0050604 A1* | 3/2010 | Hoard et al. .................... 60/286 |
| 2010/0111789 A1 | 5/2010 | Fajardie et al. |
| 2010/0222205 A1 | 9/2010 | Ogunwumi et al. |
| 2010/0290963 A1 | 11/2010 | Andersen et al. |
| 2010/0295218 A1 | 11/2010 | Dotzel et al. |
| 2010/0296992 A1 | 11/2010 | Jiang et al. |
| 2011/0021856 A1 | 1/2011 | Lai et al. |
| 2011/0281720 A1 | 11/2011 | Andersen et al. |

FOREIGN PATENT DOCUMENTS

| | | | |
|---|---|---|---|
| EP | 1 338 322 A1 | | 8/2003 |
| EP | 1 493 484 A1 | | 1/2005 |
| EP | 1 739 066 A1 | | 1/2007 |
| EP | 1 837 063 A1 | | 9/2007 |
| EP | 2 105 589 A1 | | 9/2009 |
| EP | 2 123 354 A1 | | 11/2009 |
| EP | 2 130 589 A2 | | 12/2009 |
| EP | 2 130 603 A2 | | 12/2009 |
| EP | 2 130 605 A2 | | 12/2009 |
| GB | 2 450 484 A | | 12/2008 |
| JP | 63-72342 A | | 4/1988 |
| JP | 2010-497 A | | 1/2010 |
| JP | 2010-499 A | | 1/2010 |
| WO | WO-99/47260 A1 | | 9/1999 |
| WO | WO-2006/093802 A2 | | 9/2006 |
| WO | WO-2008/049491 A1 | | 3/2008 |
| WO | WO-2008/132452 A2 | | 11/2008 |
| WO | WO-2008/154739 A1 | | 12/2008 |
| WO | WO-2009/001131 A1 | | 12/2008 |
| WO | WO-2009/080155 A1 | | 7/2009 |
| WO | WO-2009/093071 A1 | | 7/2009 |
| WO | WO-2010/099288 A2 | | 9/2010 |
| WO | WO-2010/099395 A1 | | 9/2010 |
| WO | WO-2011/026573 A1 | | 3/2011 |
| WO | WO-2011/080525 A1 | | 7/2011 |

OTHER PUBLICATIONS

Ido et al., "Fundamental Study and Possible Application of New Concept Honeycomb Substrate for Emission Control," *SAE Technical Paper Series*, Paper No. 2007-01-0658, Copyright © 2007 SAE International.

Howitt et al., "Cellular Ceramic Diesel Particulate Filter," *SAE Technical Paper Series*, Paper No. 810114, Copyright © 1981 Society of Automotive Engineers, Inc.

Heck et al., *Catalytic Air Pollution Control—Commercial Technology*, Second Edition, John Wiley & Sons, Inc., New York, 2002, Chapters 7 and 9, pp. 130-185 and 212-262.

International Search Report dated Jul. 1, 2011, from PCT International Application No. PCT/GB2011/050164.

British Search Report dated May 31, 2011, from British Patent Application No. 11017191.1.

* cited by examiner

US 8,641,993 B2

$NO_x$ ABSORBER CATALYSTS

CROSS-REFERENCE TO RELATED APPLICATIONS

This application is the U.S. National Phase application of PCT International Application No. PCT/GB2011/050164, filed Feb. 1, 2011, and claims priority of U.S. Provisional Patent Application No. 61/300,279, filed Feb. 1, 2010, the disclosures of both of both are incorporated herein by reference in their entireties for all purposes.

FIELD OF THE INVENTION

The present invention relates to catalysts comprising an extruded solid body for use in treating oxides of nitrogen contained in exhaust gas emissions from internal combustion engines from stationary source and particularly mobile applications, i.e. motor vehicles.

BACKGROUND OF THE INVENTION

US 2002/0077247 discloses a $NO_x$ storage catalyst in honeycomb form, wherein the honeycomb is formed from at least one alkaline earth metal sulphate as precursor compound of a $NO_x$ storage material. The catalyst typically contains a transition metal, preferably a metal from the group consisting of palladium, platinum, rhodium, iridium and ruthenium, which metals may be introduced by sol impregnation or by dipping in a salt solution.

Society of Automotive Engineers (SAE) Technical Paper 2007-01-0658 is entitled "Fundamental Study and Possible Application of New Concept Honeycomb Substrate for Emission Control" and discloses a diesel oxidation catalyst (DOC) comprising a platinum catalyst dispersed on a catalytic carrier comprising a plurality of extruded segments of gamma-alumina, inorganic fibres and (unnamed) binding material adhesively combined into a full size block. The platinum is applied to the catalytic carrier by a normal impregnation method at 1.0 to 2.7 g per litre. The paper suggests that a $NO_x$ Storage Catalyst (NSC) can also be made in the same way, although no specific example is provided.

EP 1739066 discloses a honeycomb structure comprising multiple honeycomb units having multiple through holes; and a seal layer that joins honeycomb units with each other via respective closed outer faces of the honeycomb units where the through holes are not open. The honeycomb unit includes at least inorganic particles, inorganic fibers and/or whiskers. The inorganic particles exemplified are alumina, titania, silica and zirconia; the inorganic fibres exemplified are silica alumina fibres; and the inorganic binders exemplified are silica sol, alumina sol, sepiolite and attapulgite. A catalyst component can be carried on the honeycomb structure. The catalyst component may include at least one type selected among noble metals including platinum, palladium and rhodium, alkali metals such as potassium and sodium, alkaline earth metal e.g. barium and oxides. The honeycomb structure can be used as a catalytic converter e.g. a three-way catalyst or a $NO_x$ storage catalyst for conversion of the exhaust gas of vehicles.

WO 2009/093071 discloses a wall-flow filter monolith substrate having a porosity of at least 40% formed from a selective catalytic reduction catalyst of extruded type.

SUMMARY OF THE INVENTION

We have now developed a family of catalysts comprising an extruded solid body and at least one metal with particular application in the field of exhaust gas aftertreatment of internal combustion engine exhaust gas. Such exhaust gases may result from stationary source emissions, but they have been developed for use in particular for treating mobile sources of emissions, such as passenger cars, trucks and buses.

According to one aspect, the invention provides a $NO_x$ absorber catalyst comprising an extruded solid body comprising either: (A) 10-95% by weight of at least one binder/matrix component; and 5-90% by weight of a zeolitic molecular sieve, a non-zeolitic molecular sieve or a mixture of any two or more thereof, which catalyst comprising at least one metal comprising (a) at least one precious metal; and (b) at least one alkali metal or at least one alkaline earth metal, wherein (a) and (b) are carried in one or more coating layer(s) on a surface of the extruded solid body; or (B) 10-95% by weight of at least one binder/matrix component; and 5-80% by weight optionally stabilised ceria, which catalyst comprising at least one metal comprising (a) at least one precious metal; and (b) at least one alkali metal or at least one alkaline earth metal, wherein:

(i) the at least one alkali metal or the at least one alkaline earth metal is present throughout the extruded solid body;

(ii) a majority of the at least one alkali metal or the at least one alkaline earth metal is located at a surface of the extruded solid body;

(iii) the at least one alkali metal or the at least one alkaline earth metal is carried in one or more coating layer(s) on a surface of the extruded solid body;

(iv) the at least one alkali metal or the at least one alkaline earth metal is present throughout the extruded solid body and is also present in a higher concentration at a surface of the extruded solid body;

(v) the at least one alkali metal or the at least one alkaline earth metal is present throughout the extruded solid body and is also carried in one or more coating layer(s) on a surface of the extruded solid body; or (vi) the at least one alkali metal or the at least one alkaline earth metal is present throughout the extruded solid body, is present in a higher concentration at a surface of the extruded solid body and is also carried in one or more coating layer(s) on the surface of the extruded solid body.

BRIEF DESCRIPTION OF THE DRAWINGS

In order that the invention may be more fully understood, the following Examples are provided by way of illustration only and with reference to the accompanying drawings in which.

DETAILED DESCRIPTION OF THE INVENTION

Figure 1:
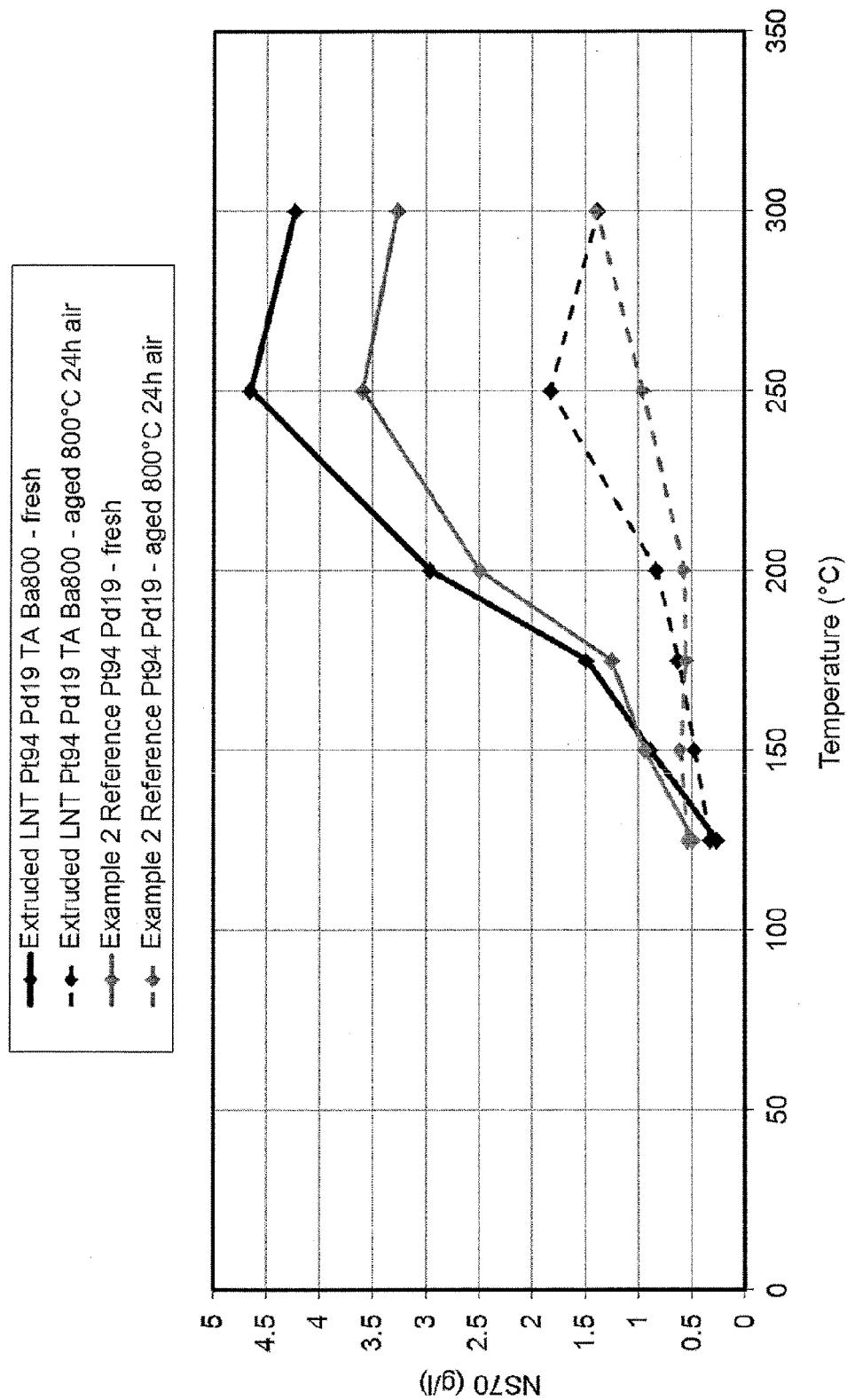
FIG. 1 is a graph plotting the point at which cumulative $NO_x$ efficiency falls below 70% (in g/l) for a $NO_x$ absorber catalyst sample according to the invention compared with a reference sample against different evaluation temperatures.

The reason for separating the invention into embodiments (A) and (B) is that zeolitic molecular sieves and non-zeolitic molecular sieves are generally acidic in nature (e.g. as determined by temperature programmed desorption). However, the process of absorbing oxides of nitrogen from an exhaust gas generally involves oxidising nitrogen monoxide to nitrogen dioxide, which is mildly acidic, and absorbing the nitrogen dioxide on a basic metal compound such as a cerium compound, an alkali metal compound or an alkaline earth metal compound. It follows that if the zeolitic molecular sieve or the non-zeolitic molecular sieve is associated with a basic metal compound, the capacity for the basic metal compound to absorb oxides of nitrogen is decreased.

However, the presence of zeolitic molecular sieves and/or non-zeolitic molecular sieves can be beneficial in that it can promote so-called "cold start" hydrocarbon conversion by adsorbing cold start hydrocarbons at below the temperature at which a precious metal component catalyses the oxidation of hydrocarbons to carbon dioxide and water and promotes hydrocarbon desorption as the temperature of the precious metal catalyst increases to above its "light-off" temperature for oxidising hydrocarbons. It is known that certain associated metals can contribute to HC adsorption with advantage for the present invention. Preferred adsorption promoting metals include Pd and/or Cu, Ag, alkaline earth metals and alkali metals, e.g. Cs. In the latter case, however, the alkali metal and alkaline earth metal is intended to promote hydrocarbon adsorption and not $NO_x$ absorption.

Therefore, in embodiments where it is desired to promote cold start hydrocarbon adsorption by including zeolitic and/or non-zeolitic molecular sieves in the extruded solid body and/or in one or more coating layer(s), embodiments (A) and (B) are designed to substantially prevent the alkali metal compound, the alkaline earth metal compound or the cerium compound intended for $NO_x$ adsorption contacting the zeolitic and/or non-zeolitic molecular sieve. For this reason, in embodiment (A) the alkali metal compound, the cerium compound and/or the alkaline earth metal compound are present in one or more coating layer(s). Embodiments of (B) can include a coating layer including a zeolitic and/or a non-zeolitic molecular sieve. However, in these embodiments the zeolitic and/or the non-zeolitic molecular sieve is present in a separate discrete layer from the alkali metal compound, the cerium compound and/or the alkaline earth metal compound.

An advantage of the present invention is that by removing catalytic components that are often used in catalytic coatings, the number of coatings can be reduced, e.g. from two layers to one layer; or a single layer can be removed altogether and catalytic metal can be supported on a surface of the extruded solid body as such. This has benefits in reducing backpressure in an exhaust system, increasing the efficiency of the engine.

Furthermore, by providing the possibility of uncoated catalysts, the extruded solid body can be manufactured at higher cell density, increasing strength and decreasing the thickness of cell walls which can improved light off performance and increasing activity through mass transfer.

Also it is possible to increase the volume of active components in an extruded solid body relative to a coating on an inert substrate monolith. This increased catalyst density has advantages for long term durability and catalyst performance, which is important for on-board diagnostics.

"On board diagnostics" (OBD) in the context of a motor vehicle is a generic term to describe the self diagnostic and reporting capability of the vehicle's systems provided by a network of sensors linked to a suitable electronic management system. Early examples of OBD systems would simply illuminate a malfunction indicator light if a problem were detected, but it provided no information on the nature of the problem. More modern OBD systems use a standardised digital connection port and are capable of providing information on standardised diagnostic trouble codes and a selection of real-time data, which enable rapid problem identification and resolution of a vehicle's systems.

Current OBD requirements require that a driver must be notified in case of a malfunction or deterioration of the emission system that would cause emissions to exceed mandatory thresholds. So, for example, the OBD limits for Euro 4: 98/69/EC for passenger diesel vehicles (category M vehicles as defined by 70/156/EEC) are: carbon monoxide (CO)—3.2 g/km; hydrocarbons (HC)—0.4 g/km; nitrogen oxides ($NO_x$)—1.2 g/km; and particulate matter (PM) 0.18 g/km. For passenger petrol (gasoline) vehicles, the Euro 4 limits are: CO—3.2 g/km; HC—0.4 g/km; $NO_x$—0.6 g/km; and PM—no limit.

Future vehicular emissions legislation, especially in US and Europe, requires higher sensitivity in diagnostic function so as continuously to monitor the ability of an exhaust system aftertreatment catalyst to meet the emission legislation. For example, the current draft OBD limits for Euro 5: 715/2007/EC for compression ignition (diesel) passenger vehicles are: CO—1.9 g/km; non-methane hydrocarbons (NMHC)—0.25 g/km; $NO_x$—0.54 g/km; PM—0.05 g/km; and for positive ignition (gasoline) passenger vehicles: CO—1.9 g/km; NMHC—0.25 g/km; $NO_x$—0.54 g/km; and PM—no limit.

In US it is understood that the OBD II legislation (Title 13, California Code Regulations, Section 1968.2, Malfunction and Diagnostic System Requirements for 2004 and Subsequent Model-Year Passenger Cars, Light-Duty Trucks and Medium-Duty Vehicles and Engines) for catalyst monitoring of gasoline/spark ignited engines requires a malfunction signal where the average Federal Test Procedure (FTP) test for NMHC conversion efficiency of a monitored portion of a catalyst system falls below 50%.

Extruded solid bodies according to the present invention generally comprise a unitary structure in the form of a honeycomb having uniform-sized and parallel channels extending from a first end to a second end thereof. Generally, the channels are open at both the first and second ends—a so-called "flow through" configuration. Channel walls defining the channels are porous. Typically an external "skin" surrounds a plurality of the channels of the extruded solid body. The extruded solid body can be formed from any desired cross section, such as circular, square or oval. Individual channels in the plurality of channels can be square, triangular, hexagonal, circular etc. Channels at a first, upstream end can be blocked e.g. with a suitable ceramic cement, and channels not blocked at the first, upstream end can also be blocked at a second, downstream end to form a so-called wall-flow filter. Typically, the arrangement of the blocked channels at the first, upstream end resembles a chequer board with a similar arrangement of blocked and open downstream channel ends.

It is clear that the honeycomb structure disclosed in EP 1739066 has a Thermal Shock Parameter (TSP) too low to be used in a single unitary extrudate, because the honeycomb structure comprises an assembly of individual honeycomb units cemented together. This, arrangement, also seen in commercially available silicon carbide honeycombs, is designed to avoid catastrophic catalyst substrate failure due to inter alia thermal shock as a result of a relatively high Coefficient of Thermal Expansion (CTE) of the extruded material. However, the manufacture of a honeycomb structure from individual honeycomb units is complicated, laborious, time consuming and expensive and increases the number of possible physical failure modes, e.g. at the cement bonds, compared with a single piece extrusion. A more complete explanation of TSP and CTE can be found in "Catalytic Air Pollution Control—Commercial Technology", Second Edition, R. M. Heck et al., John Wiley & Sons, Inc., New York, 2002 Chapters 7 (in relation to flowthrough monoliths) and 9 (for wall-flow filters).

Accordingly, we prefer that the extruded solid body of the catalyst according to the invention has an axial Thermal Shock Parameter (TSP) and a radial TSP sufficient to avoid radial cracks and ring cracks in the extruded solid body when used for treating exhaust gases from a stationary or mobile source of emissions. In this way the extruded solid body can be formed from a single unitary extrudate. For extruded solid bodies having a particularly large cross-section, it may still be necessary to extrude segments of the extruded solid body for cementing together. However, this is because of difficulties in processing extrudates of such a large cross section, or because of limitations in the size of the extrudate die tooling. Taken individually, however, each segment of the whole catalyst would meet the functional limitation that the axial TSP and the radial TSP are sufficient to avoid radial cracks and ring cracks in the individual extruded solid body segments when used for treating exhaust gases from a stationary or mobile source of emissions. In one embodiment the radial TSP is >0.4 at 750° C., such as >0.5, >0.6, >0.7, >0.8 >0.9 or >1.0. At 800° C., the radial TSP is desirably also >0.4 and at 1000° C. is preferably >0.8.

The CTE of wall-flow filters is preferably $20 \times 10^{-7}$/° C. in order to be formed from a one-piece extrudate.

In one embodiment the at least one precious metal in (A) or (B) is supported in one or more coating layer(s) on a surface of the extruded solid body, wherein the or each coating layer comprises one or more of optionally stabilised alumina, silica, titania, optionally stabilised ceria, optionally stabilised zirconia, vanadia, lanthana, a spinel and mixtures of any two or more thereof. In alternative embodiments of embodiment (B) (ii), (iv) and (vi) the at least one precious metal e.g. Pt and/or Pd is impregnated on the extruded solid body.

In a particular embodiment of (A) or (B) comprising two or more coating layer(s), a first, bottom layer comprises a mixture of optionally stabilised ceria and a spinel. Preferably, the first, bottom layer comprises Pt and/or Pd. In a preferred embodiment, a second layer is disposed to overlie the first, bottom layer, which second layer comprises rhodium supported on one or more of alumina and optionally stabilised zirconia. In a further embodiment, a third layer is disposed to overlie the second layer, which third layer comprises a zeolite or platinum and/or palladium supported on a bulk reducible oxide that is substantially free of alkali metals and alkaline earth metals.

In an alternative embodiment of (B) comprising one or more coating layer(s), platinum and/or palladium is located at a surface of the extruded solid body and a first, bottom layer comprises rhodium supported on one or more of alumina and optionally stabilised zirconia. In a particular embodiment, a second layer overlying the second layer comprises a zeolite or platinum and/or palladium supported on a bulk reducible oxide that is substantially free of alkali metals and alkaline earth metals.

Embodiments comprising a layer comprising platinum or both platinum and palladium supported on a bulk reducible oxide that is substantially free of alkali metals and alkaline earth metals, are particularly useful for treating carbon monoxide and unburned hydrocarbons present in exhaust gas of Diesel engines. Generally a $NO_x$ absorber catalyst implicitly defines that the engine with which the $NO_x$ absorber catalyst is used in conjunction is configured to operate lean of the stoichiometric air/fuel combustion ratio for absorbing oxides of nitrogen and intermittently to run rich of the stoichiometric air/fuel combustion ratio in order to desorb absorbed $NO_x$ and to reduce $NO_x$ to $N_2$. It has been found that, very surprisingly, by contacting an oxidation catalyst comprising platinum or both platinum and palladium and a reducible oxide intermittently and momentarily with a rich exhaust gas, the oxidation catalyst can recover oxidation activity lost when the platinum becomes oxidised at higher temperatures. When oxidised, the Pt component is less active for CO and HC oxidation. The presence of alkaline earth metal or alkali metal in contact with the Pt poisons the activity of the Pt to oxidise CO and HC.

The bulk reducible oxide can be selected from the group consisting of oxides, composite oxides and mixed oxides comprising one or more metal selected from the group consisting of manganese, iron, tin, copper, cobalt or cerium and optionally stabilised homologues thereof, but is preferably cerium-based. So for example the at least one reducible oxide can comprise $MnO_2$, $Mn_2O_3$, $Fe_2O_3$, $SnO_2$, CuO, CoO and $CeO_2$.

The stabilised homologue of $CeO_2$ may comprise zirconia, at least one non-cerium rare earth oxide or both zirconia and at least one non-cerium rare earth oxide.

In preferred embodiments, the first metal oxide support consists essentially of bulk at least one reducible oxide or optionally stabilised homologues thereof. Alternatively, the at least one reducible oxide or optionally stabilised homologue thereof may be supported on the first metal oxide support with the platinum.

In embodiments, the at least one binder/matrix component can be selected from the group consisting of cordierite, nitrides, carbides, borides, intermetallics, lithium aluminosilicate, a spinel, an optionally doped alumina, a silica source, titania, zirconia, titania-zirconia, zircon and mixtures of any two or more thereof.

Spinels can be $MgAl_2O_4$ or the Mg can be partially replaced by a metal from the group consisting of Co, Zr, Zn or Mn. Testing of catalysts wherein the extruded solid body comprises a spinel is underway, however preliminary indications are that $MgAl_2O_4$-based components can provide particular activity benefits to $NO_x$ trap embodiments of the present invention ($NO_x$ traps are sometimes also referred to as $NO_x$ storage/reduction (NSR) catalysts, DeNO$_x$ traps (DNT), lean NO—traps (LNT), $NO_x$ absorber catalysts (NACs), $NO_x$ abatement catalysts and $NO_x$ storage catalysts (NSC). In such a $NO_x$ trap embodiment the content of MgO in the $MgAl_2O_4$ relative to $Al_2O_3$ can be from 0.8 to 2.5, with values of <1.0 preferred.

The alumina binder/matrix component is preferably gamma alumina, but can be any other transition alumina, i.e. alpha alumina, beta alumina, chi alumina, eta alumina, rho alumina, kappa alumina, theta alumina, delta alumina, lanthanum beta alumina and mixtures of any two or more such transition aluminas.

It is preferred that the alumina is doped with at least one non-aluminium element to increase the thermal stability of the alumina. Suitable alumina dopants include silicon, zirconium, barium, lanthanides and mixtures of any two or more thereof. Suitable lanthanide dopants include La, Ce, Nd, Pr, Gd and mixtures of any two or more thereof.

Sources of silica can include a silica, a silica sol, quartz, fused or amorphous silica, sodium silicate, an amorphous aluminosilicate, an alkoxysilane, a silicone resin binder such as methylphenyl silicone resin, a clay, talc or a mixture of any two or more thereof.

Of this list, the silica can be $SiO_2$ as such, feldspar, mullite, silica-alumina, silica-magnesia, silica-zirconia, silica-thoria, silica-berylia, silica-titania, ternary silica-alumina-zirconia, ternary silica-alumina-magnesia, ternary-silica-magnesia-zirconia, ternary silica-alumina-thoria and mixtures of any two or more thereof. Alternatively, the silica can be derived from calcining tetramethyl ortho silicate (TMOS) added to the extrusion composition.

Suitable clays include fullers earth, sepiolite, hectorite, a smectite, a kaolin and mixtures of any two or more thereof, wherein the kaolin can be chosen from subbentonite, anauxite, halloysite, kaolinite, dickite, nacrite and mixtures of any two of more thereof; the smectite can be selected from the group consisting of montmorillonite, nontronite, vermiculite, saponite and mixtures of any two or more thereof; and the fullers earth can be montmorillonite or palygorskite (attapulgite).

Inorganic fibres are selected from the group consisting of carbon fibres, glass fibres, metal fibres, boron fibres, alumina fibres, silica fibres, silica-alumina fibres, silicon carbide fibres, potassium titanate fibres, aluminum borate fibres and ceramic fibres.

Suitable molecular sieves for use in the present invention are those capable of adsorbing unburned hydrocarbons following cold-start of an automobile engine and desorbing adsorbed hydrocarbons at above ambient temperature, e.g. when an associated precious metal-based oxidation catalyst component has reached a desired light-off temperature for e.g. CO and HC oxidation or $NO_x$ reduction. Such molecular sieves are generally not those having an 8-ring pore opening structure as its largest pore opening structure, sometimes called "small pore" molecular sieves. Preferred molecular sieves are medium pore (maximum 10-ring pore opening structure), large pore (maximum 12-ring pore opening structure) or oven meso pore (>12-ring pore opening structure) molecular sieves.

The or each zeolitic molecular sieve or the or each non-zeolitic molecular sievecan be selected from the framework type code ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOF, BOG, BPH, BRE, BSV, CAN, CAS, CDO, CFI, CGF, CGS, CHA, -CHI, -CLO, CON, CZP, DAC, DDR, DFO, DFT, DOH, DON, EAB, EDI, EMT, EON, EPI, ERI, ESV, ETR, EUO, EZT, FAR, FAU, FER, FRA, GIS, GIU, GME, GON, GOO, HEU, IFR, IHW, IMF, ISV, ITE, ITH, ITR, ITW, IWR, IWS, IWV, IWW, JBW, JRY, KFI, LAU, LEV, LIO, -LIT, LOS, LOV, LTA, LTF, LTL, LTN, MAR, MAZ, MEI, MEL, MEP, MER, MFI, MFS, MON, MOR, MOZ, MRE, MSE, MSO, MTF, MTN, MTT, MTW, MWW, NAB, NAT, NES, NON, NPO, NSI, OBW, OFF, OSI, OSO, OWE, -PAR, PAU, PHI, PON, RHO, -RON, RRO, RSN, RTE, RTH, RUT, RWR, RWY, SAO, SAS, SAT, SAV, SBE, SBN, SBS, SBT, SFE, SFF, SFG, SFH, SFN, SFO, SFS, SGT, SIV, SOD, SOF, SOS, SSF, SSY, STF, STI, STO, STT, STW, -SVR, SZR, TER, THO, TOL, TON, TSC, TUN, UEI, UFI, UOS, UOZ, USI, UTL, VET, VFI, VNI, VSV, WEI, -WEN, YUG, ZON as defined by the Structure Commission of the International Zeolite Association and mixtures of any two or more thereof.

Preferred zeolitic and non-zeolitic molecular sieves are selected from the group consisting of BEA, FAU, FER, MFI, MFS, MOR, STI, SZR and mixtures of any two or more thereof.

Particularly preferred zeolitic or non-zeolitic molecular sieves are selected from the group consisting of BEA, FER, MFI, STI and mixtures of any two or more thereof. Particularly preferred zeolitic molecular sieves are ZSM-5, beta, ferrierite and mixtures of any two or more thereof.

Although natural zeolitic molecular sieves can be used in the present invention, we prefer synthetic aluminosilicate zeolitic molecular sieve having a silica-to-alumina ratio of 10 or greater, for example 15 to 150, 20 to 60 or 25 to 40 for improved thermal stability.

In an alternative embodiment, the zeolitic molecular sieve or the non-zeolitic molecular sieve is an isomorph containing one or more substituent framework metal. In this embodiment, the or each substituent framework metal can be selected from the group consisting of As, B, Be, Ce, Co, Cu, Fe, Ga, Ge, Li, Mg, Mn, Zn and Zr, with Ce, Cu and Fe. Again, preferred isomorphic zeolitic or non-zeolitic molecular sieves can be selected from the group consisting of BEA, FER, MFI, STI and mixtures of any two or more thereof, with BEA including Fe in its framework particularly preferred. It will be understood that the process of manufacturing such isomorphs containing one or more substituent framework metal, the or each metal may be present in the final product either solely in the framework or in the framework and ion-exchanged.

Silica-to-alumina ratios in isomorphs containing one or more substituent framework metal can be >25, such as 30 to 100 or 40 to 70. By contrast, the isomorph can have a silica-to-framework metal ratio of >20, such as from 30 to 200 or 50 to 100.

In a preferred embodiment, the non-zeolitic molecular sieve is an aluminophosphate, including AlPOs, metal substituted AlPOs (MeAlPOs), silicoaluminophosphates (SAPOs) or a metal substituted silicoaluminophosphates (MeAPSOs). Preferred non-zeolitic molecular sieves include SAPO-18, SAPO-34, SAPO-44 and SAPO-47.

Silica-to-alumina ratios of the aluminophosphates are generally much lower than aluminosilicate zeolites sharing the same framework type code. Typically, the silica-to-alumina ratio of aluminophosphates is <1.0, but can be <0.5 or even <0.3.

The ceria component can be optionally stabilised with at least one non-cerium element to increase the thermal stability of the ceria. Suitable ceria stabilisers include zirconium, lanthanides and mixtures of any two or more thereof. Lanthanide stabilisers include La, Nd, Pr, Gd and mixtures of any two or more thereof. The $CeO_2:ZrO_2$ ratio by weight can be e.g. between 80:20 or 20:80. Commercially available materials include 30% by weight $CeO_2$, 63% $ZrO_2$, 5% $Nd_2O_3$, 2% $La_2O_3$; and 40% $CeO_2$, 50% $ZrO_2$, 4% $La_2O_3$, 4% $Nd_2O_3$ and 2% $Y_2O_3$.

Broadly, the at least one metal can be present: (a) throughout the extruded solid body, i.e. the at least one metal is present in the extrudate composition; (b) present in a higher concentration at a surface of the extruded solid body; and/or (c) carried in one or more coating layer(s) on a surface of the extruded solid body in embodiment (A) and in embodiment (B) features (iii), (v) and (vi), is different from the at least one metal present in each of the other location(s) at (a), (b) and (c). So the at least one metal can be present at location (a), (b), (c), (a) plus (b), (a) plus (c) or (a) plus (b) plus (c). Where the at least one metal is present in (a) and (b), (a) and (c) or (a), (b) and (c), the at least one metal in each location can be the same or different.

Where the at least one metal is present in location (a), i.e. throughout the extruded solid body, the at least one metal can be associated, where present, with a zeolitic molecular sieve, a non-zeolitic molecular sieve or a mixture of any two or more thereof. An example of "associated with" includes being ion exchanged with the zeolitic molecular sieve component, the non-zeolitic molecular sieve component or either or both of the zeolitic molecular sieve component and the non-zeolitic molecular sieve components in the mixture. It is also possible in mixtures of two or more molecular sieves to have the at least one metal associated with one molecular sieve and not the other. For example, a first molecular sieve can be ion-exchanged with copper, dried and calcined and then mixed with a different molecular sieve with no associated additional metal.

Alternatively, one of two molecular sieves in a mixture can be associated, e.g. ion exchanged, with a first at least one metal and then a second at least one metal can be added to the extrudate composition, i.e. the second at least one metal is not specifically associated with the second molecular sieve.

Suitable at least one metal(s) to associate with the or each molecular sieve component can be selected individually from the group consisting of a transition metal, a lanthanide or a mixture of any two or more thereof. Suitable transition metals include Group IB metals, Group IVB metals, Group VB metals, Group VIIB metals and Group VIII metals. Preferably the at least one transition metal is selected from the group consisting of Fe, Cu, Ce, Hf, La, Mn, Pt, Au, Ag, In, Rh, V, Ir, Ru, and Os and mixtures of any two or more thereof. The lanthanide metal can be La, Pr, Ce and mixtures of two or more thereof.

The total metal content in the at least one metal associated with the or each molecular sieve component is from 0.1 to 20% by weight, such as from 1 to 9% by weight.

The at least one metal present: throughout the extruded solid body but not associated with the or each molecular sieve; in the majority of the at least one metal located at the surface of the extruded solid body; in one or more coating layer(s) on the surface of the extruded solid body; or in the higher concentration at the surface of the extruded solid body can be selected from the group consisting of a transition metal, a lanthanide or a mixture of any two or more thereof.

Suitable coatings for supporting catalytic metals for use in the present invention include one or more of alumina ($Al_2O_3$), particularly γ-alumina, silica ($SiO_2$), titania ($TiO_2$), ceria ($CeO_2$), zirconia ($ZrO_2$), vanadia ($V_2O_5$), lanthana ($La_2O_3$) and zeolites. The ceria and alumina can be optionally stabilised using the same stabilisers as used for the extruded solid body. Suitable catalytic metals include one or more of the precious metals (Au, Ag and the platinum group metals, including Pt, Pd and Rh)). In order to promote the HC adsorption activity of the extruded zeolite which has been coated with a precious metal containing washcoat, it can be advantageous to use a so-called wide-pore supports, e.g. alumina, as washcoat support for the precious metal (see e.g. U.S. Pat. No. 6,110,862, i.e. a catalytic material comprising a platinum group metal component dispersed on a refractory inorganic oxide support phase, the support phase comprising a first support material having a pore size distribution in which about 98% of the pore volume of the first support material is provided by pores that have a radius in the range of about 30 to 240 Å).

Techniques for locating at least one metal in higher concentration at the surface of the extruded solid body include impregnation, preferably thickened impregnation, i.e. an impregnation medium thickened with a rheology modifier. Drying methods can also be used to concentrate metals at a surface of the extruded solid body. For example, a so-called "egg shell" technique, where metals are concentrated at the surface can be obtained by drying the impregnated extruded solid body relatively slowly so that the metals are deposited at the surface by wicking. Particular choices of salts and pH conditions can also be used to direct metal deposition, e.g. by determining the isoelectric point of the extruded solid body and then using the correct combination of pH and metal salts to benefit from an electrostatic attraction between cations or anions in the metal salts and the extruded solid body.

Suitable transition metals include a Group IB metal, a Group IVB metal, a Group VB metal, a Group VIB metal, a Group VIIB metal and a Group VIII metal. Preferably, the or each transition metal is selected from the group consisting of Fe, Ni, W, Cu, Ce, Hf, La, Mn, Pt, Au, Ag, In, V, Ir, Ru, Rh, Os and mixtures of any two or more thereof; lanthanide metals can be La, Pr or Ce or mixtures of any two or more thereof; alkali metals include K and Cs; and alkaline earth metals can be selected from Ba and Sr.

The total metal content throughout the extruded solid body but not associated with the or each molecular sieve component; located at the surface of the extruded solid body; and/or in the higher concentration at the surface of the extruded solid body can be from 0.1 to 20% by weight, such as from 1 to 9% by weight.

The total metal content of the extruded solid body, i.e. including any metal associated with the or each molecular sieve, can be from 0.1 to 25% by weight, such as from 1 to 15% by weight.

The total metal content of the catalyst as a whole, including one or more coating layer(s) on a surface of the extruded solid body comprises at least one metal, can be from 0.1 to 30% by weight, such as from 1 to 25% by weight.

In specific examples of embodiment (A), the $NO_x$ absorber catalyst according to the invention comprises an extruded solid body comprising:
10-100% by weight of a cordierite, nitrides, carbides, borides, intermetallics, lithium aluminosilicate, an optionally doped alumina, a silica source, titania, zirconia, titania-zirconia, zircon and mixtures of any two or more thereof;
0-80% by weight of spinel;
0-90% by weight of a zeolitic molecular sieve, a non-zeolitic molecular sieve or a mixture of any two or more thereof, each optionally containing one or more metal;
0-80% by weight optionally stabilised ceria; and
0-25% by weight inorganic fibres.

In specific examples of embodiment (B) the $NO_x$ absorber catalyst according to the invention comprises an extruded solid body comprising:
10-95% by weight of a cordierite, nitrides, carbides, borides, intermetallics, lithium aluminosilicate, an optionally doped alumina, a silica source, titania, zirconia, titania-zirconia, zircon and mixtures of any two or more thereof;
0-80% by weight of spinel;
5-80% by weight optionally stabilised ceria; and
0-25% by weight inorganic fibres.

The content of the at least one binder/matrix component can be >15% by weight, >20% by weight, >30% by weight, >35% by weight, >40% by weight, >45% by weight, >50% by weight, >55% by weight, >60% by weight, >65% by weight or >70% by weight, >75% by weight, >80% by weight, >85% by weight or >90% by weight.

The content of the spinel can be >10% by weight, >15% by weight, >20% by weight, >30% by weight, >35% by weight, >40% by weight, >45% by weight, >50% by weight, >55% by weight, >60% by weight, >65% by weight or >70% by weight.

The content of the total content of the molecular sieve(s) can be >5% by weight, >10% by weight, >15% by weight, >20% by weight, >30% by weight, >35% by weight, >40% by weight, >45% by weight, >50% by weight, >55% by weight, >60% by weight, >65% by weight or >70% by weight, >75% by weight, >80% by weight, >85% by weight or >90% by weight.

The content of the optionally stabilised ceria can be >5% by weight, >10% by weight, >15% by weight, >20% by weight, >30% by weight, >35% by weight, >40% by weight, >45% by weight, >50% by weight, >55% by weight, >60% by weight, >65% by weight or >70% by weight.

The content of the inorganic fibres can be >5% by weight, >10% by weight, >15% by weight or >20% by weight.

In an embodiment particularly suited for a catalyst for reducing oxides of nitrogen using a nitrogenous reductant the extruded solid body consists essentially of: 10-50% by weight of cordierite, nitrides, carbides, borides, intermetallics, lithium aluminosilicate, a spinel, an optionally doped alumina, a source of silica, titania, zirconia, titania-zirconia, zircon and mixtures of any two or more thereof; 50-90% by weight of a zeolitic molecular sieve, a non-zeolitic molecular sieve or a mixture of any two or more thereof, each optionally containing one or more metal; and 0-25% by weight of inorganic fibres. This extruded solid body can be arranged as a flow through substrate monolith or it can be used to make a wall-flow filter. Preferred embodiments contain inorganic fibres.

Further embodiments can use an extruded solid body consisting essentially of: 10-37% by weight of cordierite, nitrides, carbides, borides, intermetallics, lithium aluminosilicate, an optionally doped alumina, a spinel, a silica source, titania, zirconia, titania-zirconia, zircon and mixtures of any two or more thereof; 60-88% by weight of a zeolitic molecular sieve, a non-zeolitic molecular sieve or a mixture of any two or more thereof, each optionally containing one or more metal; and 0-20% by weight of inorganic fibers; or: 15-30% by weight of cordierite, nitrides, carbides, borides, intermetallics, lithium aluminosilicate, an optionally doped alumina, a spinel, titania, zirconia, titania-zirconia, zircon and mixtures of any two or more thereof; 2-20% by weight of a source of silica; 50-81% by weight of a zeolitic molecular sieve, a non-zeolitic molecular sieve or a mixture of any two or more thereof, each optionally containing one or more metal; and 2-10% by weight of inorganic fibres.

In another embodiment the extruded solid body can consist essentially of: 10-80% by weight of cordierite, nitrides, carbides, borides, intermetallics, lithium aluminosilicate, an optionally doped alumina, a spinel, a silica source, titania, zirconia, titania-zirconia, zircon and mixtures of any two or more thereof; 0-50% by weight of a zeolitic molecular sieve, a non-zeolitic molecular sieve or a mixture of any two or more thereof, each optionally containing one or more metal; 20-80% by weight optionally stabilised ceria; and 0-25% by weight of inorganic fibres. Preferred embodiments contain zeolites and inorganic fibres.

A particularly preferred embodiment for use in making a $NO_x$ trap or a NOx trap filter comprises an extruded solid body consists essentially of: 10-80% by weight of cordierite, nitrides, carbides, borides, intermetallics, lithium aluminosilicate, an optionally doped alumina, titania, zirconia, titania-zirconia, zircon and mixtures of any two or more thereof; 0-20% by weight of a source of silica; 0-50% by weight of magnesium aluminate spinel; 20-80% by weight optionally stabilised ceria; and 0-20% by weight inorganic fibres. It may also be desirable to include zeolites in the extruded solid body in order to improve $NO_x$ conversion, particularly following cold start. Preferred embodiments contain magnesium aluminate spinel and inorganic fibres.

In a particular embodiment, the alkaline earth such as Ba and/or Sr and/or the alkali metal e.g. K and/or Cs can be spray dried on the optionally stabilised ceria and the resulting spray dried product used to form the extruded solid body.

In developing solid bodies for use, in $NO_x$ absorber catalysts according to the present invention, we have encountered a lack of strength in the extruded solid body in the composition: 69% by weight of $CeO_2$, and 23% by weight of $\gamma$-$Al_2O_3$ and 8% by weight glass fibres. Current proposals for increasing strength include pre-calcining the $CeO_2$ material to reduce surface loss during calcinations of the "green" extruded solid body; increasing the alumina content to 50%+; changing the particle size of the alumina (e.g. from commercially available Pural™ to Disperal™) and/or the optionally stabilised ceria; adding an inert binder to increase mechanical stability e.g. a clay; use a different alumina e.g. an alumina sol; testing other binder systems e.g. $TiO_2$ sols, $CeO_2$ sols; cerium acetate; zirconium acetate; optimising the pH; and adding surface modifiers e.g. aluminium salts or other organic surfactants. In preliminary tests we have found that the presence of silica can affect $NO_x$ trap performance. However, research is continuing and this option will be further investigated. However, in one embodiment the content of a source of silica will be reduced or removed altogether.

A further advantage of $NO_x$ absorber catalyst embodiments according to the invention (including $NO_x$ absorber catalyst filters) is that alkali metals such as potassium in catalyst coatings can interact with cordierite substrates, weakening the substrate and/or reducing the catalyst activity. One possible reason is that the alkali metal interacts with the silicates in the cordierite. By use of catalysts according to the invention, such interaction can be reduced or avoided, particularly where low silica content is used.

In a further embodiment particularly suitable for $NO_x$ absorber catalysts and $NO_x$ absorber catalyst filters, the extruded solid body consists essentially of: 10-50% by weight of cordierite, nitrides, carbides, borides, intermetallics, lithium aluminosilicate, an optionally doped alumina, titania, zirconia, titania-zirconia, zircon and mixtures of any two or more thereof; 0-10% by weight of a source of silica; 20-50% by weight of magnesium aluminate; 20-70% by weight optionally stabilised ceria; and 0-10% by weight inorganic fibres.

Where any of the above extruded solid bodies are made into a wall-flow filter, the porosity of the wall-flow filter can be from 30-80%, such as from 40-70%.

In more specific examples according to the present invention, the $NO_x$ absorber catalyst comprises an extruded solid body, consisting essentially of: 10-100% by weight of cordierite, nitrides, carbides, borides, intermetallics, lithium aluminosilicate, an optionally doped alumina, titania, zirconia, titania-zirconia, zircon and mixtures of any two or more thereof; 0-40% by weight of a source of silica; 0-80% by weight of magnesium aluminate spinel; 0-80% by weight optionally stabilised ceria; 0-25% by weight inorganic fibres; and 0-20% by weight of a $H_2S$ gettering component, which extruded solid catalyst body being impregnated directly with a composition comprising an alkali metal, an alkaline earth metal, a lanthanide, or any combination of two or more thereof; platinum, palladium or platinum and palladium and being coated with a single layer comprising supported rhodium. In this embodiment the $H_2S$ gettering component can be selected from a metal compound wherein the metal is selected from the group consisting of Ni, Fe and Mn. The $NO_x$ absorber catalyst ($NO_x$ trap) can be in the form of a wall-flow filter or in the flow-through configuration.

According to a further aspect, the invention provides process of manufacturing a catalyst according to any preceding claim, which process comprising the steps of: forming a solid extruded body by mixing powdered starting materials of: at least one binder/matrix component or a precursor of one or more thereof; optional zeolitic molecular sieve, non zeolitic molecular sieve or a mixture of any two or more thereof which optional zeolitic molecular sieve, non-zeolitic molecular sieve or mixture of zeolitic and non-zeolitic molecular sieves being optionally associated with at least one metal; an optional optionally stabilised ceria; and an optional at least one metal compound; with optional inorganic fibers; optionally adding an organic auxiliary agent; processing by mixing and/or kneading in an acid or alkaline aqueous solution optionally containing a metal salt of at least one metal into a plastic compound to form a mixture; extruding the mixture into a catalyst body, drying the catalyst body and calcining to form a solid extruded body; selecting quantitative proportions of the starting materials such that the solid extruded body contains (A) 10-95% by weight of at least one binder/matrix component; and 5-90% by weight of a zeolitic molecular sieve, a non-zeolitic molecular sieve or a mixture of any two or more thereof; or (B) 10-95% by weight of at least one binder/matrix component; and 5-80% by weight optionally stabilised ceria; and optionally impregnating a surface of the solid extruded body with at least one metal and/or optionally coating a surface of the solid extruded body with at least one coating layer(s) containing at least one metal.

Very generally, the production of an extruded solid body, a binder, an organic viscosity-enhancing compound and a liquid for converting the material by blending into an homogeneous paste are added to the binder/matrix component or a precursor thereof and optional molecular sieve, optional optionally stabilised ceria, optional inorganic fibres and optional at least one metal compound, and the mixture is compacted in a mixing or kneading apparatus or an extruder. The mixtures have organic additives such as binders, plasticizers, surfactants, lubricants, dispersants as processing aids to enhance wetting and therefore produce a uniform batch. The resulting plastic material is then moulded, in particular using an extrusion press or an extruder including an extrusion die, and the resulting mouldings are dried and calcined. The organic additives are "burnt out" during calcinations of the extruded solid body.

The at least one binder/matrix component is selected from the group consisting of cordierite, nitrides, carbides, borides, intermetallics, lithium aluminosilicate, a spinel, an optionally doped alumina, a silica source, titania, zirconia, titania-zirconia, zircon and mixtures of any two or more thereof. An alumina precursor can be used which is aluminium hydroxide or boehmite. Where an aluminium oxide is used, to ensure the binding with the aluminium oxide, it is advantageous to add an aqueous solution of a water-soluble metal salt to the aluminium oxide or the precursor substance of the aluminium oxide before adding the other starting materials.

In embodiments, the silica source can be selected from the group consisting of a silica, a silica sol, quartz, fused or amorphous silica, sodium silicate, an amorphous aluminosilicate, an alkoxysilane, a silicone resin binder, a clay, talc or a mixture of any two or more thereof.

In a particular embodiment, the silica source is a silicone resin binder and a solvent for the silicone resin binder is isopropyl alcohol or a dibasic ester.

One embodiment of the process according to the present invention comprises the step of first admixing an optionally doped alumina or a precursor thereof with the solution and subsequently admixing the zeolitic molecular sieve, non zeolitic molecular sieve or a mixture of any two or more thereof and the inorganic fibres.

The organic auxiliary agent for use in the process according to the present invention can be one or more selected from the group consisting of a cellulose derivative, an organic plasticizer, a lubricant and a water-soluble resin. Examples of suitable cellulose derivatives include cellulose ethers selected from the group consisting of methylcellulose, ethylcellulose, carboxymethylcellulose, ethylhydroxyethylcellulose, hydroxyethylcellulose, hydroxypropylcellulose, methylhydroxyethylcellulose, methylhydroxypropylcellulose and combinations of any two or more thereof. Cellulose derivatives increase the porosity of the final product, which is advantageous for the catalytic activity of the solid catalyst body. Initially the cellulose swells in the aqueous suspension but is ultimately removed during the calcining process.

The organic plasticizer for use in the process of the present invention is selected from the group consisting of polyvinyl alcohol, polyvinyl butyral, an ionomer, acrylics, copolyethylene/acrylic acid, polyurethane, a thermoplastic elastomers, a relatively low molecular weight polyester, linseed oil, a ricinoleate and combinations of any two or more thereof.

The water-soluble resin can be a polyacrylate.

The lubricant for use in the process according to the present invention is selected from at least one of the group consisting of ethylene glycol, stearic acid, sodium stearate, glycerine and glycols.

Depending on the composition of the extrudate composition, the pH can be acid or alkaline. Where the process uses an acidic aqueous solution, the pH-value of the solution can be between 3 and 4. Desirably, acetic acid is used to acidify the solution.

Where the process uses an alkaline aqueous solution, the pH-value of the solution can be between 8 and 9. Ammonia can be used to adjust the pH to the alkaline side.

According to a further aspect, the invention provides a method of converting oxides of nitrogen ($NO_x$) in exhaust gas emitted from a vehicular internal combustion engine, which method comprising contacting a lean exhaust gas with a $NO_x$ absorber catalyst according to the invention to adsorb $NO_x$ thereon and intermittently contacting the $NO_x$ absorber catalyst with a rich exhaust gas to desorb adsorbed $NO_x$ and to convert $NO_x$ to $N_2$. The internal combustion engine can be a compression ignition engine or a positive ignition engine. A positive ignition engine is typically fuelled with gasoline fuel, but other fuels can be used including gasoline fuel blended with oxygenates including methanol and/or ethanol, liquid petroleum gas or compressed natural gas. Compression ignition engines can be fuelled by diesel fuel, blends of diesel fuel and biodiesel or Fischer-Tropsch derived fuels, biodiesel as such or natural gas as such. Modern compression ignition engines including those known as the Dilution Controlled Combustion System (DCCS), for example Toyota's Smokeless Rich Combustion concept. Emissions from Homogeneous Charge Compression Ignition (HCCI) engines may also be treated. In particular, modern engines wherein substantially all fuel for combustion is injected into a combustion chamber prior to the start of combustion may be treated.

According to another aspect the invention provides an exhaust system for an internal combustion engine (optionally as defined hereinabove), which exhaust system comprising a $NO_x$ absorber catalyst according to the invention.

According to a further aspect, the invention provides a motor vehicle comprising an internal combustion engine and an exhaust system according to the invention. The motor vehicle generally comprises means, when in use, to operate the engine according to the method of converting oxides of nitrogen ($NO_x$) in exhaust gas emitted from a vehicular internal combustion engine according to the invention.

EXAMPLES

Example 1

Extruded Solid Body

An appropriate amount of $CeO_2$ is mixed with glass fibres and powdered synthetic boehmite (Pural SB) and is processed in an acetous aqueous solution with a pH-value of 3.5 into a shapeable and flowable slip containing 1.2 wt % cellulose (CMC-QP10000H (Nordmann)) and 10 wt % of the organic auxiliary agent PEO Alkox (a polyethylene oxide). The quantitative proportions of the starting materials are selected in such a way that the active material of the finished solid catalyst body contains 69% by weight of $CeO_2$, and 23% by weight of $\gamma$-$Al_2O_3$ and 8% by weight glass fibres. The shapeable mixture is extruded into a honeycomb catalyst body with continuous channels and with a circular cross-section exhibiting a cell density of 300 cpsi (cells per square inch). Subsequently, the catalyst body is freeze dried for 1 hour at 2 mbar according to the method described in WO 2009/080155 (the entire contents of which is incorporated herein by reference) and calcined at a temperature of 580° C. to form a solid catalyst body. The extruded monolith substrate has an inflow area with a diameter of approximately 14 cm and a flow-through length of approximately 19 cm. A 1 inch×3 inch core is cut from this sample for catalyst preparation.

Example 2

Catalyst Preparation

The 1 inch×3 inch core of Example 1 was impregnated with Pt and Pd by the total adsorption method: Pt nitrate (0.988 g, Pt assay 10.08%) and Pd nitrate (1.037 g, Pd assay 1.94%) were diluted in demineralised water to give a 50 ml solution. The solid body was placed into this solution so that it was fully submerged, then left to stand for a total of 24 hours. The solid body was removed from the solution, excess solution removed using a flow of compressed air, then dried in airflow at 100° C. The solid body was then calcined at 500° C. for 1 hour (ramp up 4° C./min). ICP analysis was carried out on the remaining solution and confirmed that <1% of the Pt/Pd remained. Barium was added by dip impregnation: barium acetate (8.88 g) was dissolved in demineralised water to give 50 ml of solution (55.3 g). The core was submerged in the solution for 1 minute, then excess solution was removed by flow of compressed air. Mass of solution absorbed by core=9.70 g. The core was dried and calcined as described above.

A reference core was prepared as follows: To a slurry of alumina (4494 g of gamma alumina at 44.5% crucible solids) was added Pt nitrate (540 g, Pt assay 10.07%) and Pd nitrate (73 g, Pd assay 15.14%) with stirring. The resulting washcoat was left to stand for 1 hour, after which ceria (2083 g), barium acetate (861 g) and cerium acetate (565 g) were added sequentially with stirring. Demineralised water was added to achieve a crucible solids content of 42.5%, followed by 0.5 wt % of hydroxyethylcellulose thickener. The resulting washcoat was dosed onto a standard ceramic monolith (4.66 inch×3 inch, 400 cpsi, 6 thousandths of an inch wall thickness) using methods disclosed in WO 99/47260 (the entire contents of which is incorporated herein by reference), dried in airflow at 100° C. and calcined at 500° C. for 1 hour. A core of equivalent volume to the Example 1 sample was taken from the resulting catalyst.

Example 3

$NO_x$ Storage Testing

Both the catalysed extruded solid and the reference sample of Example 2 represent the lower layer of a fully formulated $NO_x$ absorber catalyst. In a fully formulated $NO_x$ absorber catalyst, both samples would be coated with an additional layer comprising rhodium supported on alumina or a stabilised zirconia. The lower layer of the fully formulated $NO_x$ absorber catalyst is designed for $NO_x$ storage and so its activity for $NO_x$ storage can be assessed independently of the additional layer.

The aforementioned samples were tested on a laboratory synthetic catalyst activity test (SCAT) apparatus in a NOx storage test. The gas mixtures used are given in Table 1.

TABLE 1

Gas mixtures for NOx storage test

| | SV ($h^{-1}$) | HC* (ppm C1) | CO (ppm) | $H_2$ (ppm) | $CO_2$ (%) | NO (ppm) | $O_2$ (%) | $H_2O$ (%) |
|---|---|---|---|---|---|---|---|---|
| Lean | 60000 | 430 | 700 | 0 | 5 | 150 | 15 | 4 |
| Rich | 52300 | 5000 | 24000 | 3120 | 9 | 0 | 0 | 5 |

*2:1 propene:propane

The test consisted of a preconditioning step to clean the catalyst of any stored $NO_x$, followed by a storage step. This is repeated for six different evaluation temperatures: 125, 150, 175, 200, 250 and 300° C. The preconditioning step consisted of a temperature ramp to 450° C. (at 40° C./min in $N_2$) followed by 120 s in the rich gas mixture once the temperature had stabilised. The sample was then allowed to cool in $N_2$ to the evaluation temperature of the test. The lean gas mixture (without NO) was introduced and allowed to stabilise, then the storage period commenced with the introduction of NO into the gas flow. The cumulative $NO_x$ efficiency was monitored as the storage period proceeds. This is defined as:

$$\text{Cumulative } NOx \text{ efficiency } (\%) = \frac{\text{Cumulative } NOx \text{ stored (g/l)}}{\text{Cumulative } NOx \text{ in (g/l)}} \times 100$$

The NOx storage period continued until the cumulative $NO_x$ efficiency fell below 70%. The cumulative $NO_x$ stored at this point (in g/l) is the $NO_x$ Storage 70% or "NS70" value, which can be plotted for different evaluation temperatures.

Following an initial test on the unaged (or "fresh") samples, the samples were oven-aged at 800° C. for 24 hours in air and the aged samples were re-tested.

The results of the assessment of are shown in FIG. 1, in which the sample according to the invention is referenced as "Extruded LNT". It can be seen that the impregnated extruded solid body according to the invention shows better $NO_x$ storage activity than the reference both fresh and aged across all temperatures between 175-300° C. inclusive.

An advantage of the Example 2 article is that, when fully formulated to include the rhodium-containing layer, the catalyst as a whole comprises an extruded solid body coated with one layer. By contrast, the reference sample comprises a substrate monolith having two layers. The two layers can decrease the cross section of the flow channel, leading to increased backpressure or, if the backpressure is addressed by loading less washcoat (in $g/in^3$), the overall activity of the catalyst may be reduced.

Example 4

Extruded $V_2O_5$/$WO_x$—$TiO_2$ Filter

A Reference extruded $V_2O_5$/$WO_x$—$TiO_2$ solid body was prepared similarly to Examples 1 and 5 by blending components A, B, F and S as set out in Table 1 with water to make a kneadable paste. Additives H (pore modifiers) were added and the material was kneaded for 10 mins to disperse the pore modifiers. The resulting composition was extruded, dried and calcined as described in Examples 1 and 5. It should be noted that the percentage quantities of inorganic solids present in the final calcined article is 100%. Quantities of additives (here H and S) that are removed by combustion during calcination are provided in wt % relative to the 100% inorganic solids content.

of the solid extruded body. That is, although increasing porosity and pore volume etc. of this Example 6 are illustrated using $V_2O_5/WO_x$—$TiO_2$ active materials, the principles of increasing porosity and pore volume etc. disclosed in this Example 6 are applicable to the extrusion of any active material, e.g. an extruded solid body for use in a gasoline soot filter comprising a three-way catalyst, because the pore modifiers are burnt out in the calcination process leaving the active materials and fillers etc. behind as inorganic solids.

TABLE 2

| Active Components | | Binder | | | Stabilizer | Extrusion Additive | | | Additional Additives | | |
|---|---|---|---|---|---|---|---|---|---|---|---|
| A1 | A2 | B1 | B2 | B3 | F1 | H1 | H2 | H3 | S1 | S2 | S3 |
| 82.90 | 1.70 | 3.00 | 3.00 | 1.40 | 8.00 | 1.00 | 1.00 | 0.30 | 1.76 | 9.20 | 0.56 |

A1 = TiW (98.9%, MC 10/Cristal)
A2 = $V_2O_5$ from AMV (78% $V_2O_5$, GFE)
B1 = Bentonite (90%, ACE/Mizuka)
B2 = Kaolin (97.9% TK0177/Thiele)
B3 = $SiO_2$ (100%, Tixosil/Novus)
F1 = Glass fibers (Vetrotex 4.5 mm/Saint Gobain)
H1 = Cellulose (QP10000H/Nordmann)
H2 = PEO (Alkox/Alroko)
H3 = Zusoplast (Zschimmer&Schwarz)
S1 = MEA (Imhoff & Stahl)
S2 = $NH_3$
S3 = $C_3H_6O_3$ (Fauth)

The following pore modifiers were used instead of the Extrusion Additives H1, H2 and H3 in Table 2, with amounts shown being relative to the total weight of inorganic solid in the recipe of Table 2.

TABLE 3

| Pore Modifier | Wt % Used in Table 1 Recipe | Pore Volume (mm³/g) | Pore Radius (Å) | Porosity (%) |
|---|---|---|---|---|
| Reference | See Table 1 | 310.1 | 1783.6 | 39.8 |
| Cellulose CMC-QP10000H (Nordmann) | 20 | | | |
| BC200 (Kremer Pigmente GmbH & Co. KG) | 13 | | | |
| PAN Fibres | 13 | | | |
| Recycling | 9 | 333.6 | 1930.9 | 41.2 |
| Arbocel (Schwarzwälder Textil-Werke) | 10 | 427 | 2950 | 47.2 |
| HOP Fibre (Osthoff-Petrasch GmbH) | 10 | 426 | 2629 | 48.8 |
| Arbocel (Schwarzwälder Textil-Werke) | 15 | 524 | 5281 | 50.2 |
| HOP Fibre (Osthoff-Petrasch GmbH) | 15 | 543 | 3085 | 54.4 |

Porosity and pore volume and pore radius can be measured e.g. using mercury intrusion porosimetry.

Figure 2:
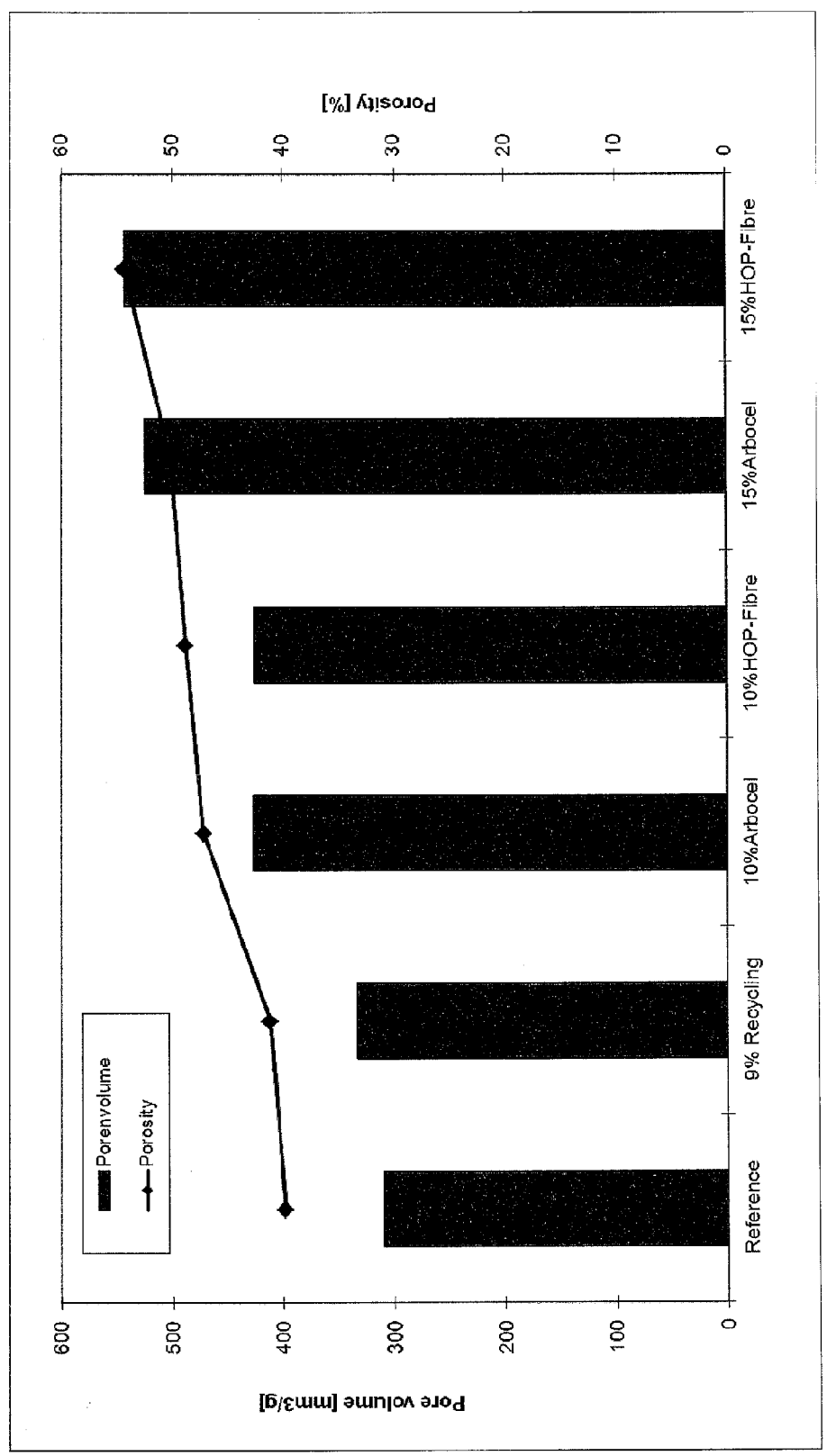
FIG. 2 is a graph comparing the pore volume and porosity of various $V_2O_5/WO_x$—$TiO_2$ filter materials prepared using various pore modifiers relative to a Reference product used in a flow-through configuration.

The results of Table 3 entries including pore volume and porosity are also represented in FIG. 2. It can be seen from these results that the porosity and pore volume of the Reference can be increased by appropriate selection of pore modifiers so that an extruded solid body made using such pore modifiers may be used in the manufacture of wall-flow filters.

Figure 3:
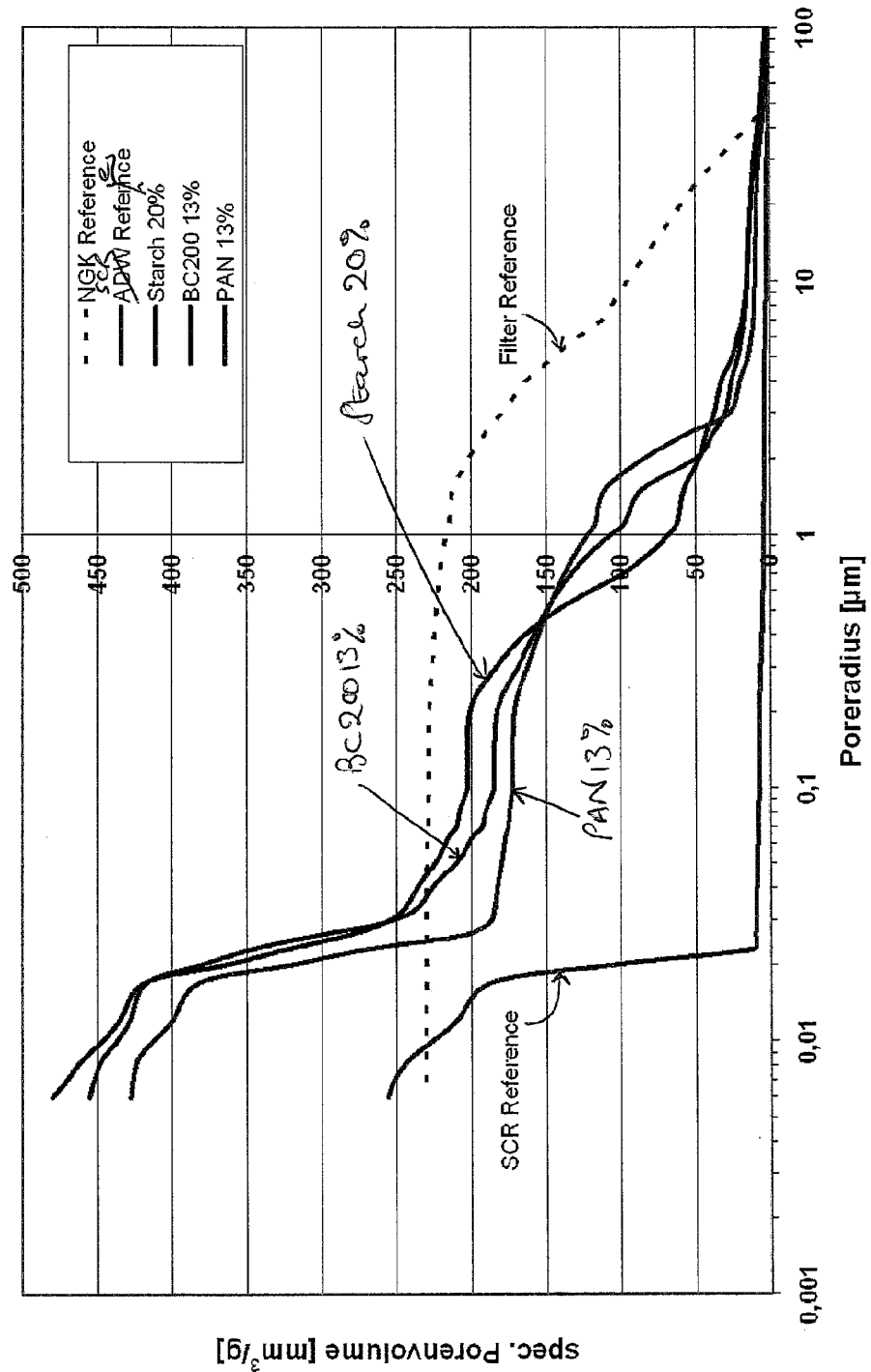
FIG. 3 is a graph plotting the pore volume against pore radius for a number of pore modifiers relative to the $V_2O_5/WO_x$—$TiO_2$ Reference and a commercially available wall-flow filter substrate.

These results are generic for increasing the porosity, pore volume etc. properties independent of the active components FIG. 3 compares the pore volume of a different Reference with solid extruded $V_2O_5/WO_x$—$TiO_2$ materials prepared using other pore modifiers set out in Table 2 compared also with a commercially available wallflow filter (NGK). It can be seen from the graph that the inclusion of pore modifiers has improved the porosity and pore volume of the Reference extruded solid body so that the materials have properties approaching those of commercially available wall-flow filters.

Example 5

Extruded Wall-Flow $NO_x$ Absorber Catalyst Filter

This is a prophetic example. An extruded monolith substrate may be prepared from the shapeable and flowable slip of Example 1, except in that a total of 13 wt % of a mixture of the pore modifiers Rettenmaier BC200, a natural cellulosic material, and polyacrylonitrile (PAN) fibres may be added to make the shapeable and flowable slip. The quantitative proportions of the starting materials may be selected in such a way that the active material of the finished solid catalyst body contains 69% by weight of $CeO_2$ and 23% by weight of $\gamma$-$Al_2O_3$ and 8% by weight glass fibres. Typically, it would be expected that the resulting product would have a mean pore size of approximately 10 μm.

The calcined extruded monolith substrate can be impregnated with a thickened impregnation medium comprising platinum nitrate, palladium nitrate and barium acetate using methods disclosed in WO 99/47260 (the entire contents of which is incorporated herein by reference). The resulting impregnated substrate can then be dried and fired. A washcoat layer comprising stabilised zirconia and rhodium nitrate can be coated on the impregnated substrate. This impregnated, then coated arrangement can then be dried and fired. The total loading of platinum and palladium can be approximately 100 gft$^{-3}$ at Pt5:Pd and barium at approximately 800 ft$^{-3}$. Rhodium can be present at about 10 gft$^{-3}$.

The extruded flow-through monolith substrate comprising a plurality of channels may be made into a wall-flow filter arrangement whereby a plurality of first channels is plugged at an upstream end and a plurality of second channels not plugged at the upstream end are plugged at a downstream end, wherein the arrangement of the first and second channels is such that laterally and vertically adjacent channels are plugged at opposite ends in the appearance of a checkerboard by inserting substantially gas impermeable plugs at the ends of the channels in the desired pattern according to EP 1837063 (the entire contents of which is incorporated herein by reference). This filter arrangement is also disclosed in SAE 810114 (the entire contents of which is incorporated herein by reference).

The Calcined Product was Impregnated

For the avoidance of any doubt, the entire contents of any and all documents cited herein are incorporated herein by reference.

The invention claimed is:

1. A $NO_x$ absorber catalyst comprising either:
   (A) an extruded solid body comprising 10-95% by weight of at least one binder/matrix component; and 5-90% by weight of a zeolitic molecular sieve, a non-zeolitic molecular sieve or a mixture of any two or more thereof, and
   at least one metal comprising (a) at least one precious metal; and (b) at least one alkali metal or at least one alkaline earth metal, wherein (a) and (b) are carried in one or more coating layer(s) on a surface of the extruded solid body; or
   (B) an extruded solid body comprising 10-95% by weight of at least one binder/matrix component; 5-80% by weight optionally stabilised ceria; and at least one metal comprising (a) at least one precious metal; and (b) at least one alkali metal or at least one alkaline earth metal, and
   a zeolitic molecular sieve, non-zeolitic molecular sieve or any mixture of any two or more thereof present in a separate discrete layer from the ceria and the at least one alkali metal or at least one alkaline earth metal, wherein:
   (i) the at least one alkali metal or the at least one alkaline earth metal is present throughout the extruded solid body;
   (ii) a majority of the at least one alkali metal or the at least one alkaline earth metal is located at a surface of the extruded solid body;
   (iii) the at least one alkali metal or the at least one alkaline earth metal is carried in one or more coating layer(s) on a surface of the extruded solid body;
   (iv) the at least one alkali metal or the at least one alkaline earth metal is present throughout the extruded solid body and is also present in a higher concentration at a surface of the extruded solid body;
   (v) the at least one alkali metal or the at least one alkaline earth metal is present throughout the extruded solid body and is also carried in one or more coating layer(s) on a surface of the extruded solid body; or
   (vi) the at least one alkali metal or the at least one alkaline earth metal is present throughout the extruded solid body, is present in a higher concentration at a surface of the extruded solid body and is also carried in one or more coating layer(s) on the surface of the extruded solid body.

2. A $NO_x$ absorber catalyst according to claim 1, wherein the at least one precious metal is supported in two or more coating layer(s) on a surface of the extruded body, and a first, bottom layer comprises a mixture of optionally stabilised ceria and a spinel.

3. A $NO_x$ absorber catalyst according to claim 2, wherein a second layer overlying the first, bottom layer comprises rhodium supported on one or more of alumina and optionally stabilised zirconia.

4. A $NO_x$ absorber catalyst according to claim 3, wherein a third layer overlying the second layer comprises a zeolite or platinum and/or palladium supported on a bulk reducible oxide that is substantially free of alkali metals and alkaline earth metals.

5. A $NO_x$ absorber catalyst according to claim 4, wherein the at least one reducible oxide comprises $MnO_2$, $Mn_2O_3$, $Fe_2O_3$, $SnO_2$, $CuO$, $CoO$ and $CeO_2$.

6. A catalyst according to claim 1, wherein the extruded solid body is of (A) consists essentially of: the at least one binder/matrix component; the zeolitic molecular sieve, the non-zeolitic molecular sieve or the mixture of any two or more thereof in an amount of from 50-90% by weight; and 0-25% by weight of inorganic fibres, wherein the at least one binder/matrix component is selected from the group consisting of cordierite, nitrides, carbides, borides, intermetallics, lithium aluminosilicate, a spinel, an optionally doped alumina, a source of silica, titania, zirconia, titania-zirconia, zircon and mixtures of any two or more thereof;
   the zeolitic molecular sieve, the non-zeolitic molecular sieve or the mixture of any two or more thereof each optionally contains one or more metal.

7. A catalyst according to claim 1, wherein the extruded solid body of (A) consists essentially of: the at least one binder/matrix component; the zeolitic molecular sieve, the non-zeolitic molecular sieve or the mixture of any two or more thereof in an amount of from 0-50% by weight; the optionally stabilised ceria in an amount of from 20-80% by weight; and 0-25% by weight of inorganic fibres, wherein the at least one binder/matrix component is selected from the group consisting of cordierite, nitrides, carbides, borides, intermetallics, lithium aluminosilicate, an optionally doped alumina, a spinel, a silica source, titania, zirconia, titania-zirconia, zircon and mixtures of any two or more thereof; and
   the zeolitic molecular sieve, the non-zeolitic molecular sieve or the mixture of any two or more thereof each optionally contains one or more metal.

8. An extruded catalyst body according to claim 1, wherein the extruded solid body of (B) consists essentially of: the at least one binder/matrix component; 0-20% by weight of a source of silica; 0-50% by weight of magnesium aluminate spinel; the optionally stabilised ceria in an amount of from 20-80% by weight; and 0-20% by weight of inorganic fibres, wherein
   the at least one binder/matrix component is selected from the group consisting of cordierite, nitrides, carbides, borides, intermetallics, lithium aluminosilicate, an optionally doped alumina, titania, zirconia, titania-zirconia, zircon and mixtures of any two or more thereof.

9. A $NO_x$ absorber catalyst according to claim 1, wherein the extruded solid body of (B) consists essentially of: the at least one binder/matrix component; 0-40% by weight of a source of silica; 0-80% by weight of magnesium aluminate spinel; the optionally stabilised ceria; 0-25% by weight of inorganic fibres; and 0-20% by weight of a $H_2S$ gettering component, which extruded solid catalyst body being impregnated directly with a composition comprising an alkali metal, an alkaline earth metal, a lanthanide, or any combination of two or more thereof; platinum, palladium or platinum and palladium and being coated with a single layer comprising supported rhodium, wherein
the at least one binder/matrix component is selected from the group consisting of cordierite, nitrides, carbides, borides, intermetallics, lithium aluminosilicate, an optionally doped alumina, titania, zirconia, titania-zirconia, zircon and mixtures of any two or more thereof.

10. A $NO_x$ absorber catalyst according to claim 9, wherein the $H_2S$ gettering component is selected from the group consisting of Ni, Fe and Mn.

11. A $NO_x$ absorber catalyst according to claim 9 in the form of a wall-flow filter.

12. A $NO_x$ absorber catalyst according to claim 9 in the flow-through configuration.

13. A $NO_x$ absorber catalyst according to claim 1, wherein at least one metal is associated with the zeolitic molecular sieve component, the non-zeolitic molecular sieve component or either or both of the zeolitic molecular sieve component and the non-zeolitic molecular sieve components in the mixture.

14. A $NO_x$ absorber catalyst according to claim 13, wherein the or each at least one metal associated with the zeolitic molecular sieve, non-zeolitic molecular sieve or both molecular sieves in the mixture of any two or more thereof, contains one or more metal selected from the group consisting of a transition metal, a lanthanide or a mixture of any two or more thereof.

15. A $NO_x$ absorber catalyst according to claim 1, wherein the at least one metal comprises the at least one alkali metal and the alkali metal is selected from K and Cs.

16. A $NO_x$ absorber catalyst according to claim 1, wherein the at least one metal comprises the at least one alkaline earth metal and the alkaline earth metal is selected from Ba and Sr.

17. A $NO_x$ absorber catalyst according to claim 1, wherein the extruded solid body of (B) further comprises at least one precious metal supported in one or more coating layer(s) on a surface of the extruded solid body, and wherein the or each coating layer of either (A) or (B) comprises one or more of optionally stabilised alumina, silica, titania, optionally stabilised ceria, optionally stabilised zirconia, vanadia, lanthana, a spinel and mixtures of any two or more thereof.

18. A $NO_x$ absorber catalyst according to claim 17, wherein platinum and/or palladium is located at a surface of the extruded solid body and wherein the one or more coating layer(s) includes a first layer comprising rhodium supported on one or more of alumina and optionally stabilised zirconia.

19. A $NO_x$ absorber catalyst according to claim 18, wherein a second layer overlying the first layer comprises a zeolite or platinum and/or palladium supported on a bulk reducible oxide that is substantially free of alkali metals and alkaline earth metals.

20. A method of converting oxides of nitrogen ($NO_x$) in exhaust gas emitted from a vehicular internal combustion engine, which method comprising contacting a lean exhaust gas with a $NO_x$ absorber catalyst to adsorb $NO_x$ thereon and intermittently contacting the $NO_x$ absorber catalyst with a rich exhaust gas to desorb adsorbed $NO_x$ and to convert $NO_x$ to $N_2$, wherein the $NO_x$ absorber catalyst comprises either:
(A) an extruded solid body comprising 10-95% by weight of at least one binder/matrix component; and 5-90% by weight of a zeolitic molecular sieve, a non-zeolitic molecular sieve or a mixture of any two or more thereof, and
at least one metal comprising (a) at least one precious metal; and (b) at least one alkali metal or at least one alkaline earth metal, wherein (a) and (b) are carried in one or more coating layer(s) on a surface of the extruded solid body; or
(B) an extruded solid body comprising 10-95% by weight of at least one binder/matrix component; 5-80% by weight optionally stabilised ceria; and at least one metal comprising (a) at least one precious metal; and (b) at least one alkali metal or at least one alkaline earth metal, and
a zeolitic molecular sieve, non-zeolitic molecular sieve or any mixture of any two or more thereof present in a separate discrete layer from the ceria and the at least one alkali metal or at least one alkaline earth metal, wherein:
(i) the at least one alkali metal or the at least one alkaline earth metal is present throughout the extruded solid body;
(ii) a majority of the at least one alkali metal or the at least one alkaline earth metal is located at a surface of the extruded solid body;
(iii) the at least one alkali metal or the at least one alkaline earth metal is carried in one or more coating layer(s) on a surface of the extruded solid body;
(iv) the at least one alkali metal or the at least one alkaline earth metal is present throughout the extruded solid body and is also present in a higher concentration at a surface of the extruded solid body;
(v) the at least one alkali metal or the at least one alkaline earth metal is present throughout the extruded solid body and is also carried in one or more coating layer(s) on a surface of the extruded solid body; or
(vi) the at least one alkali metal or the at least one alkaline earth metal is present throughout the extruded solid body, is present in a higher concentration at a surface of the extruded solid body and is also carried in one or more coating layer(s) on the surface of the extruded solid body.

21. An exhaust system for an internal combustion engine, which exhaust system comprising a $NO_x$ absorber catalyst according to claim 1.

22. A motor vehicle comprising an internal combustion engine and an exhaust system according to claim 21.

23. A process of manufacturing a NOx absorber catalyst, which process comprising the steps of:
mixing powdered starting materials, the powdered starting materials comprising one or more binder/matrix components or a precursor of one or more thereof and at least one of
(1) a zeolitic molecular sieve, a non zeolitic molecular sieve or a mixture of any two or more thereof, the zeolitic molecular sieve, non-zeolitic molecular sieve or mixture being optionally associated with at least one metal;
(2) an optionally stabilised ceria;
(3) at least one metal compound comprising (a) at least one precious metal; and (b) at least one alkali metal or at least one alkaline earth metal; and
(4) inorganic fibers;
optionally adding an organic auxiliary agent;
processing by mixing and/or kneading the powdered starting materials in an acid or alkaline aqueous solution optionally containing a metal salt of at least one metal into a plastic compound to form a mixture;

extruding the mixture into a catalyst body, drying the catalyst body, and calcining the catalyst body to form a solid extruded body;

applying one or more layers to the solid extruded body;

wherein, the one or more layers are applied and quantitative proportions of the powdered starting materials are selected such that (A) the solid extruded body comprises 10-95% by weight of the one or more binder/matrix components and 5-90% by weight of the zeolitic molecular sieve, non-zeolitic molecular sieve, or mixture of any two or more thereof; and the one or more layers comprises the at least one metal compound; or (B) 10-95% by weight of the one or more binder/matrix components; 5-80% by weight of the optionally stabilised ceria; and the at least one metal compound, and the one or more layers comprises the zeolitic molecular sieve, non-zeolitic molecular sieve or any mixture of any two or more thereof and are a separate discrete layer from the ceria and the at least one alkali metal or at least one alkaline earth metal, wherein:

(i) the at least one alkali metal or the at least one alkaline earth metal is present throughout the solid extruded body;

(ii) a majority of the at least one alkali metal or the at least one alkaline earth metal is located at a surface of the solid extruded body;

(iii) the at least one alkali metal or the at least one alkaline earth metal is carried in one or more coating layer(s) on a surface of the solid extruded body;

(iv) the at least one alkali metal or the at least one alkaline earth metal is present throughout the solid extruded body and is also present in a higher concentration at a surface of the solid extruded body;

(v) the at least one alkali metal or the at least one alkaline earth metal is present throughout the solid extruded body and is also carried in one or more coating layer(s) on a surface of the solid extruded body; or (vi) the at least one alkali metal or the at least one alkaline earth metal is present throughout the solid extruded body, is present in a higher concentration at a surface of the solid extruded body and is also carried in one or more coating layer(s) on the surface of the solid extruded body.

\* \* \* \* \*